June 10, 1958

E. B. MASON 2,838,188

STICKER FEEDER

Filed Aug. 9, 1956

INVENTOR.
Edwin B. Mason
BY
ATTYS

June 10, 1958  E. B. MASON  2,838,188
STICKER FEEDER
Filed Aug. 9, 1956  9 Sheets-Sheet 3

INVENTOR.
Edwin B. Mason
BY
ATTYS

June 10, 1958 E. B. MASON 2,838,188
STICKER FEEDER

Filed Aug. 9, 1956 9 Sheets-Sheet 4

INVENTOR.
Edwin B. Mason
BY
ATTYS

INVENTOR.
Edwin B. Mason
BY
ATTYS

June 10, 1958  E. B. MASON  2,838,188
STICKER FEEDER
Filed Aug. 9, 1956  9 Sheets-Sheet 6

INVENTOR.
Edwin B. Mason
BY
ATTYS

June 10, 1958  E. B. MASON  2,838,188
STICKER FEEDER
Filed Aug. 9, 1956  9 Sheets-Sheet 7

INVENTOR.
Edwin B. Mason
BY
ATTYS

June 10, 1958  E. B. MASON  2,838,188
STICKER FEEDER
Filed Aug. 9, 1956  9 Sheets-Sheet 8

INVENTOR.
Edwin B. Mason
BY
ATTYS

June 10, 1958  E. B. MASON  2,838,188
STICKER FEEDER
Filed Aug. 9, 1956  9 Sheets-Sheet 9

Fig. 16

INVENTOR.
Edwin B. Mason
BY
ATT'YS

United States Patent Office 2,838,188
Patented June 10, 1958

2,838,188

STICKER FEEDER

Edwin B. Mason, Stirling City, Calif.

Application August 9, 1956, Serial No. 602,994

12 Claims. (Cl. 214—8.5)

This invention relates to the lumber industry, and particularly to the stacking of sawn lumber at a saw mill.

In stacking lumber, spacers or "stickers," as they are called, are placed transversely of the lengths of lumber between the different layers or courses thereof to assure proper ventilation and drying of the lumber, and a major object of this invention is to provide a machine by means of which a plurality of stickers will be fed simultaneously into place across each course of lumber after the latter is laid on the previously fed stickers.

In connection with such feeding of the stickers, another object of the invention is to provide means to assure that they are properly disposed at right angles to the lengths of lumber, and that their ends are all alined with the outer edges of the lumber pieces in each layer.

The machine is constructed so as to provide the maximum number of stickers as is necessary for the longest lengths of lumber to be stacked; all such stickers being normally advanced simultaneously by a drive means which is common to all the sticker-supporting arms.

A further and important object of the invention is to provide means for disengaging any selected ones of such arms from the common drive means, so that only such stickers will be fed as are necessary for the particular lumber being stacked.

Still another object of the invention is to provide a practical, reliable, and durable sticker feeder, and one which will be exceedingly effective for the purpose for which it is designed.

These objects are accomplished by means of such structure and relative arrangement of parts as will fully appear by a perusal of the following specification and claims.

Referring now more particularly to the drawings and to the characters of reference marked thereon, and at present to Figs. 1–15, the machine comprises a suitable upstanding framework 1, which includes longitudinal, transversely spaced beams 2, and longitudinally spaced transverse beams 3, 4, and 5 supported on beams 2; the beams 3 being at the discharge end of the machine.

Upstanding from the framework are a number of transversely spaced sticker hoppers 6, each supported by brackets 7 mounted on beams 3 and 4. Each hopper is arranged to retain a single stack of stickers 8 disposed horizontally and lengthwise of the machine.

Disposed lengthwise of the machine below the various hoppers and above the cross beams 3 and 4, and between the hopper supporting brackets, are sticker arms 9 of channel form in section, and of a total length considerably greater than that of the sticker hoppers.

Figures 6, 7:
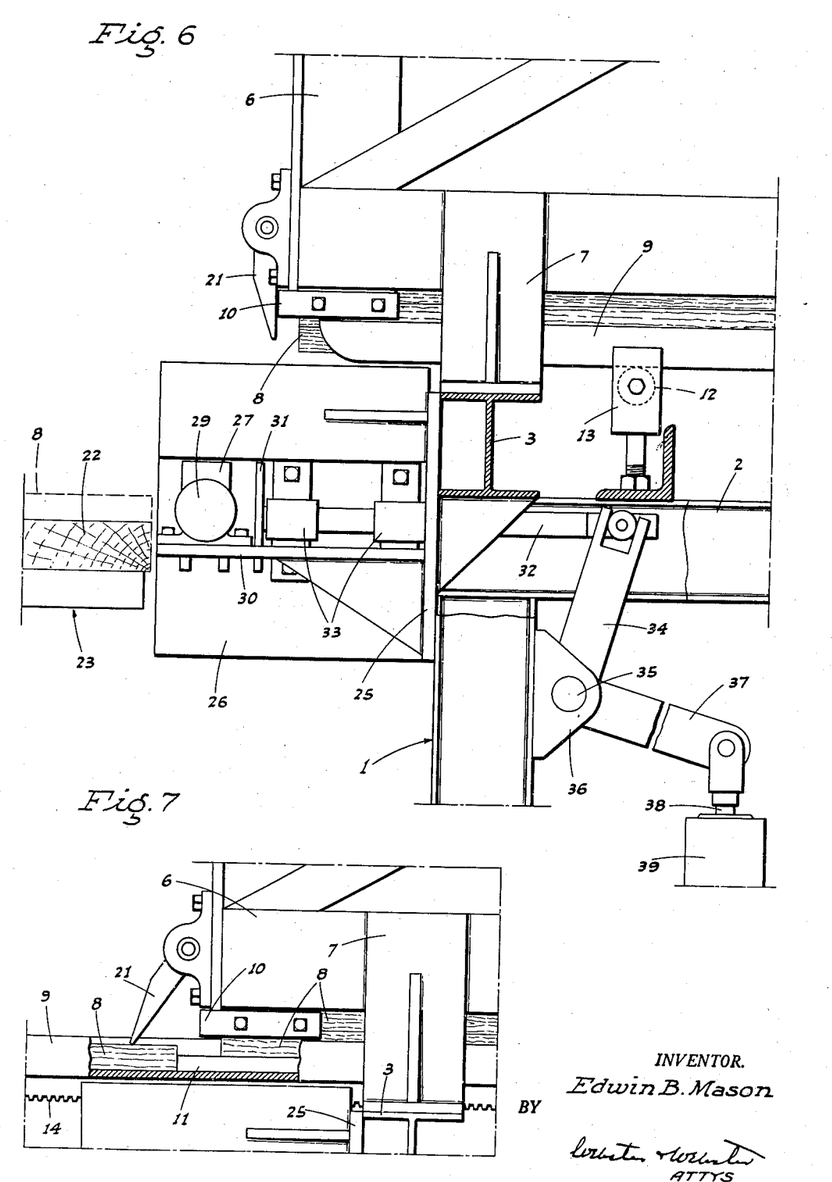
Fig. 6 is a fragmentary enlarged side elevation of one of the sticker hoppers and the sticker alining and final sticker-advance mechanism associated therewith; the sticker arm being shown fully retracted and the parts being broken away and in section.
Fig. 7 is a similar fragmentary view showing the sticker arm as fully advanced.

Initially, the forward portion of each arm is disposed under the corresponding hopper in position to receive the bottom sticker therein, as indicated in Fig. 6; the sticker immediately above being prevented from escape from the hopper by stop elements 10. Upstanding from the bottom of each arm 9 a short distance back from the sticker receiving portion thereof are longitudinal pusher bars 11 of a lesser height than that of a sticker (see Fig. 7).

Figures 3, 4, 5:
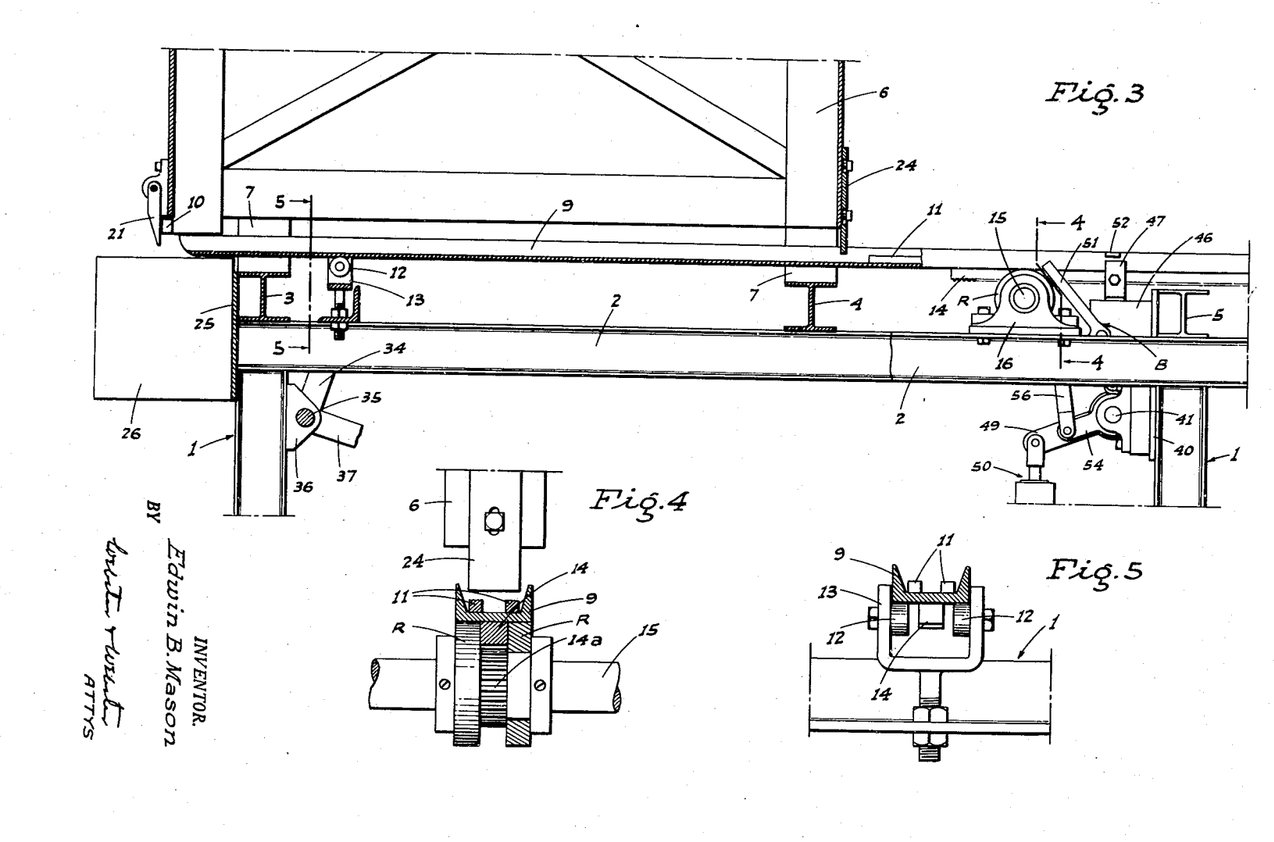
Fig. 3 is a fragmentary enlarged side view of one of the sticker hoppers and the associated feeding mechanism, partly in section and taken substantially on line 3—3 of Fig. 2.
Fig. 4 is a fragmentary cross section on line 4—4 of Fig. 3.
Fig. 5 is a similar view on line 5—5 of Fig. 3.

The sticker arms are normally supported at spaced intervals for longitudinal movement, while being held against transverse displacement, by rollers 12 mounted in frame-supported cradles 13 which lap the sides of the arms 9, as shown particularly in Fig. 5; one of said cradles being under the hopper.

Figure 1:
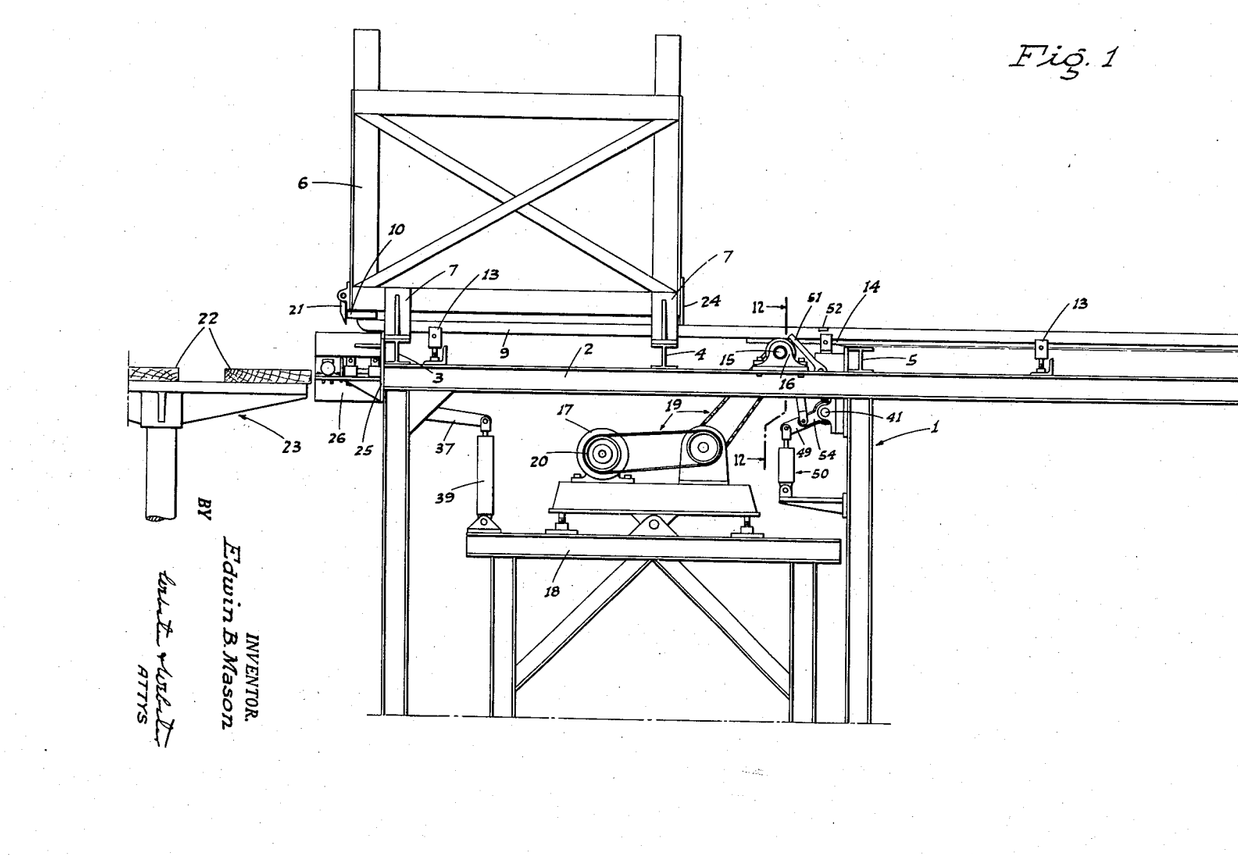
Fig. 1 is a side elevation of the sticker feeding machine.

Fixed on and under each sticker arm, and extending along that portion of the same which is initially to the rear and clear of the hopper, is a rack 14; the racks of all the arms being normally engaged by gears 14a. The gears are all fixed on a common shaft 15 journaled in bearings 16 supported on frame beams 2; said shaft being driven at a suitable point in its length by a reversible motor 17 mounted on an auxiliary frame structure 18 below beams 2. Suitable drive connections 19, which include a variable-speed pulley unit 20, extend between the motor and shaft 15, as shown in Fig. 1. Rollers R, free of the gear 14a are turnably mounted on shaft 15 on opposite sides of said gear, and engage the sticker arm in supporting relation, as shown in Fig. 4.

As the motor is operated to advance all the sticker arms 9 in unison, the stickers 8 supported thereby are engaged by the pusher bars 11 and advanced from the position under the hopper, as shown in Fig. 6, to a position clear of the same, as shown in Fig. 7. As the stickers are thus advanced they are engaged by free hanging dogs 21 mounted on the hoppers at their forward end, and which prevent retractive movement of the stickers, as indicated in Fig. 7.

Thus, as the arms retract from their fully advanced position upon reversal of the drive motor, the stickers remain in their advanced position, so that when the sticker arms are fully retracted, the advanced stickers drop clear of the arms and rest on the adjacent course of lumber 22. Such lumber is placed on the platform of a hydraulic or similar lift 23 by suitable means, which is preferably the automatic lumber stacker shown in my copending application, Serial No. 613,188, filed October 1, 1956.

In the meantime, the next sticker in each hopper becomes seated on the bars 11 by the time the sticker arms are fully advanced, as shown in Fig. 7. Such sticker is prevented from movement out of the back end of the hopper, with the retracting movement of the sticker arm, by reason of a sticker-engaging stop 24 depending into the sticker arm at such end of the hopper, and which just clears the bars 11, as shown in Fig. 3.

The sticker then drops into the forward portion of the sticker arm, ready for the next advancing movement of the latter. Before this takes place, the lift 23 is lowered somewhat, and another layer or course of lumber is placed on the stickers thus fed into place on the course below.

The stickers thus dropping from the retracting sticker arms may be somewhat askew, and in any case they are not advanced sufficiently to aline with the side edge of the course of lumber, as is desired.

It should be noted that the stops 10 form opposed jaws whose inner faces converge forwardly to a spacing slightly greater than the edgewise dimension of a sticker. Thus, while a properly placed sticker above the one being advanced is held back, the one which has been placed edgewise in the hopper can come out between the stop jaws; thereby preventing the rack and pinion from jamming.

Associated with each hopper therefore is a mechanism to first straighten or aline the stickers and then fully advance them the necessary distance, and since all the mechanisms are identical a description of one will suffice for all.

Such mechanism comprises the following arrangement of parts:

Secured to and depending from beam 3, which is a relatively short distance back from the point at which the sticker is dropped from the sticker arm, is a plate 25, disposed below the corresponding hopper 6.

Projecting from the plate 25 and positioned to one side of but adjacent the hopper 6 and parallel thereto, is a guide and sticker-stop or locating plate 26, which extends in the direction of the lift 23 to a termination adjacent said lift.

Figure 8:
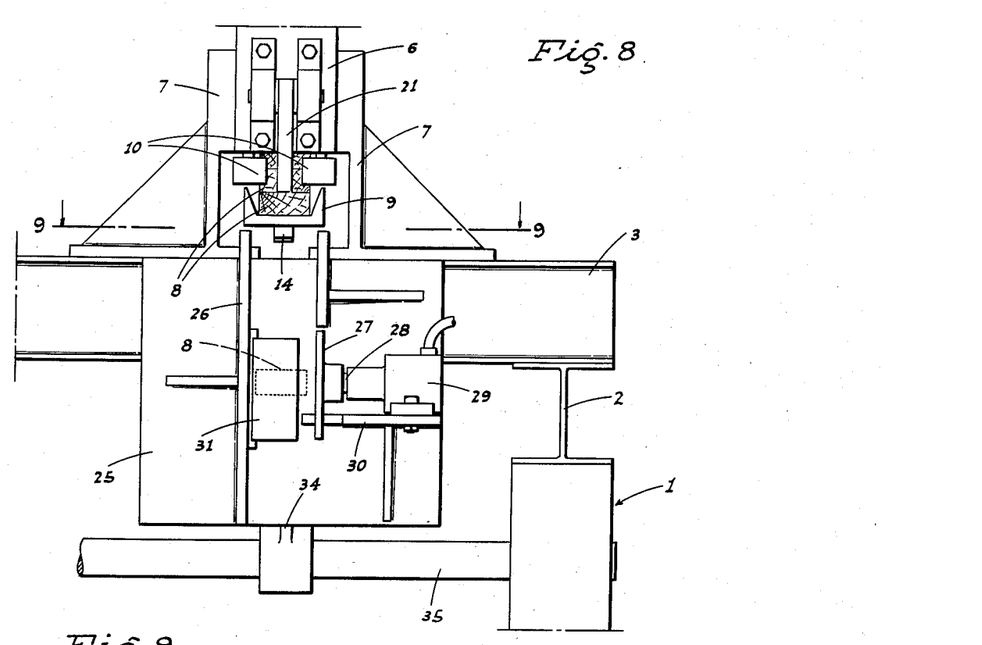
Fig. 8 is a fragmentary enlarged discharge end elevation of one of the sticker hoppers showing the sticker alining mechanism associated therewith.
Figure 9:
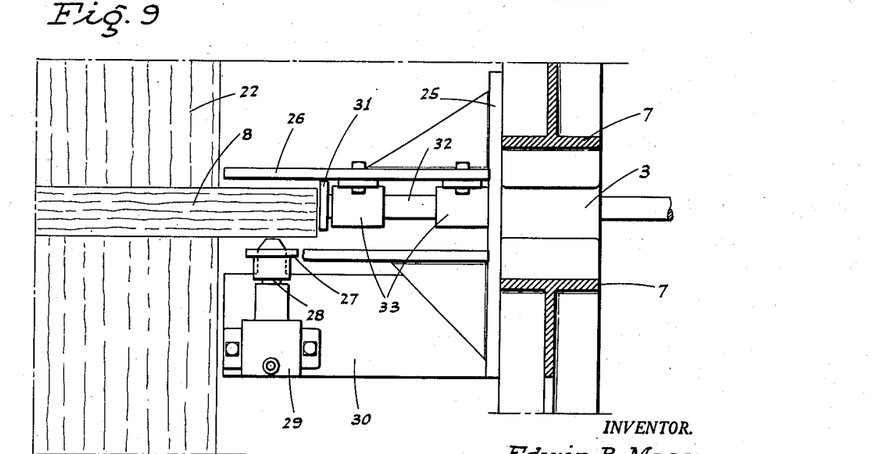
Fig. 9 is a fragmentary plan view taken on line 9—9 of Fig. 8, and showing a sticker as initially dropped onto the lumber of the stack.

Arranged in facing relation to the plate 26 in position to engage the adjacent end portion of a sticker as initially dropped from the sticker arm is a pusher pad 27, normally spaced from plate 26 a distance greater than the width of a sticker, as shown in Figs. 8 and 9. This pad is mounted for movement toward and from plate 26, or laterally of the hopper and sticker, on the outer end of the piston rod 28 of an air or similar fluid pressure cylinder 29. This cylinder is mounted on a platform 30 rigidly connected to plate 25.

Figure 2:
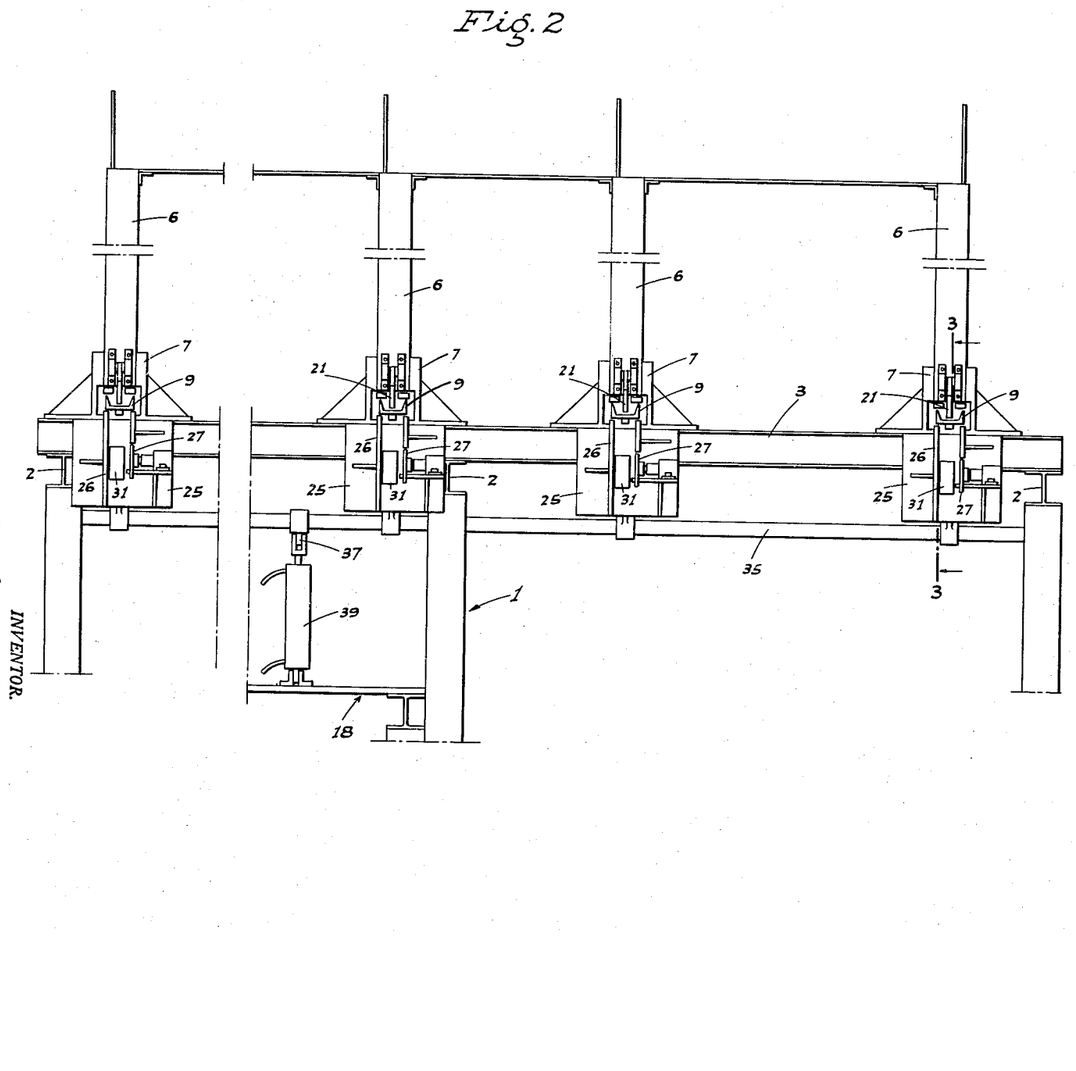
Fig. 2 is a somewhat enlarged and fragmentary end elevation of the machine, looking at the forward or discharge end thereof.

Just back of the released or dropped position of the sticker is a longitudinally movable pusher pad 31, located in a transverse plane between plate 26 and pad 27. Pad 31 is mounted on the outer end of a rod 32 guidably supported for longitudinal movement in sleeves 33 secured on plate 26. At its rear end the rod 32 is operatively connected to a lever arm 34 fixed on, and projecting upwardly from, a transverse shaft 35 journaled in bearings 36 mounted on the frame (see Fig. 6), and which shaft is common to the arms 34 of all the sticker pushing mechanism, as shown in Fig. 2.

The shaft 15 is oscillated through a predetermined arc—to reciprocate the rods 32 and pusher rods 31 simultaneously, and through the same distance—by means of a radial arm 37 projecting from the shaft and connected to the piston rod 38 of an air or similar fluid pressure cylinder 39. The cylinder 39 is supported from the auxiliary frame 18, as shown in Fig. 1.

Figure 10:
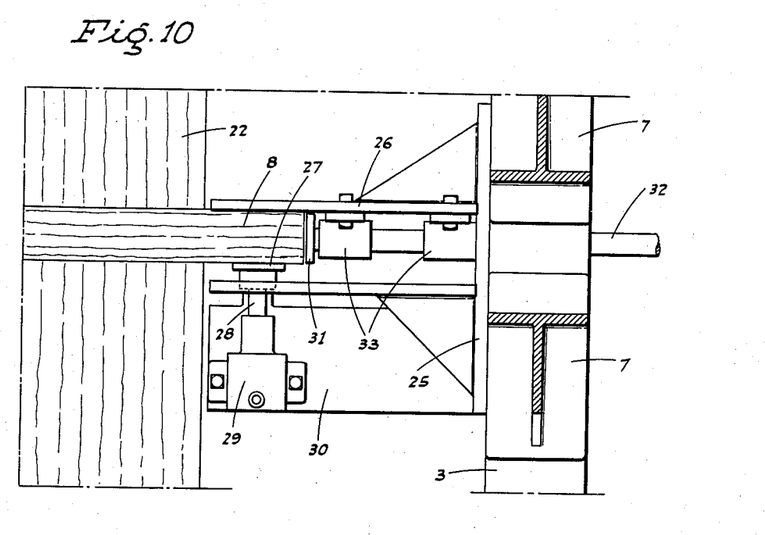
Fig. 10 is a similar view, but showing the sticker as shifted and definitely alined with the lumber transversely thereof.

In the operation of the above described mechanism, as soon as a sticker is dropped from the arm 9, cylinder 29 is actuated to advance pad 27 and so push the sticker into flat contact with the plate 26. This disposes the sticker in the proper straightened and right-angle relation to the lumber 22 on the stack being formed, as shown in Fig. 10.

Figure 11:
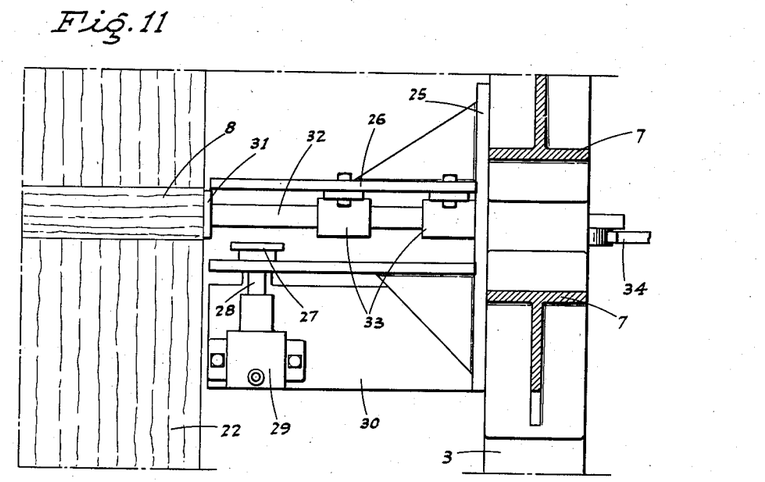
Fig. 11 is a similar view, but showing the sticker as fully advanced onto the lumber.

Immediately following this action, the cylinder 39 is actuated to cause the pusher rod 31 to advance the straightened sticker until the pad-engaged end thereof is alined with the adjacent edge of the lumber 22, as shown in Fig. 11.

The above described sticker feeding, straightening, and final advance operations are all arranged to be carried out automatically, and in the proper sequence, by the use of electrically controlled valves for the fluid cylinders, and control and limit switches for such valves and the motor actuated by the movement of the parts of the mechanisms to their respective positions, as is commonly the case in automatic machines of various kinds.

It is desirable at times to place one or more of the sticker arms out of commission, such as when the length of the lumber being stacked is shorter than the full capacity of the sticker feeding machine, and some of the stickers are not needed.

A sticker-arm release mechanism, individual for each arm, is therefore provided, and such mechanism is constructed as follows, and as particularly shown in Figs. 12–15.

Depending from the cross beam 5, which is a short distance back from shaft 15, is a mounting plate 40. A transverse shaft 41 extends across the lower portion of said plate, being journaled at its ends in bearings 42 mounted on the plate 40. A cam 43 is fixed on the shaft 41 directly below the corresponding sticker arm 9 and engages the roller 44 on the lower end of an upstanding rod 45 slidably mounted in a bearing block 46 fixed on the plate 40; the rod and roller together forming a push-rod unit.

Figure 12:
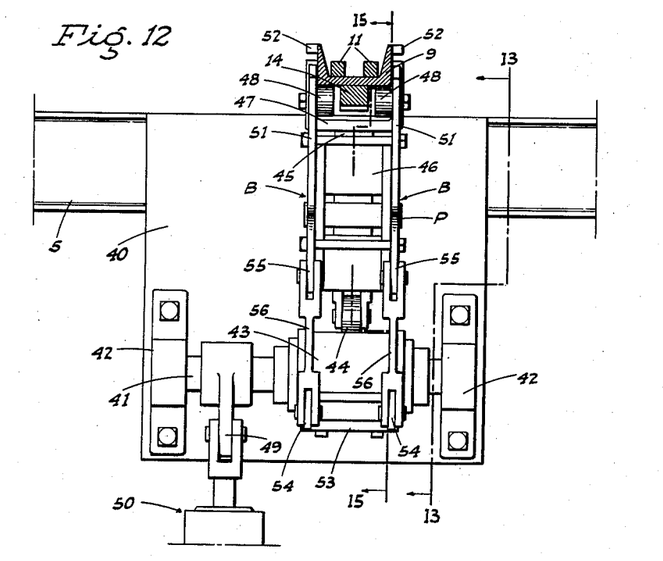
Fig. 12 is a fragmentary enlarged cross section on line 12—12 of Fig. 1, showing the preferred sticker-arm release mechanism.
Figure 13:
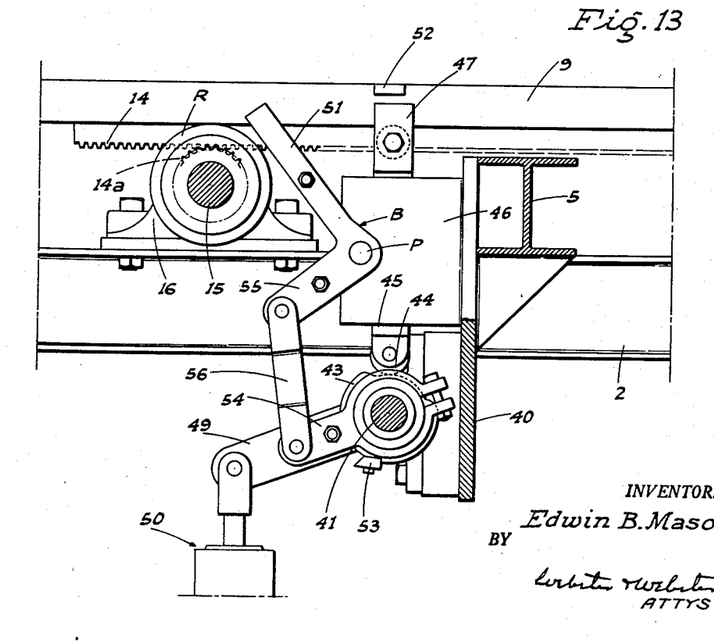
Fig. 13 is a side view of such mechanism taken on line 13—13 of Fig. 12, and showing the mechanism in its normal position.
Figure 14:
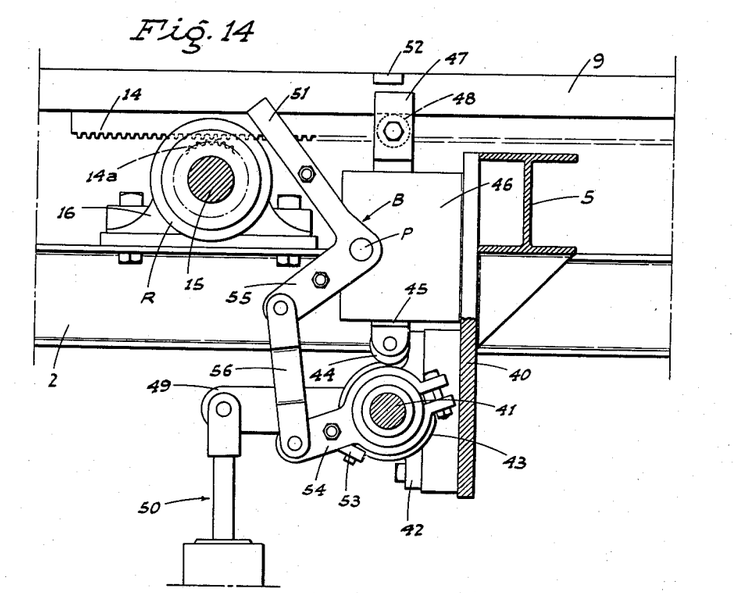
Fig. 14 is a similar view, showing the sticker arm as released from its driving gear.

At its upper end, above the block, the rod 45 carries a cradle 47 which straddles the sticker arm 9, and which cradle supports a pair of rollers 48 engaging the under side of said arm to the sides of rack 14 (see Fig. 12). The cam is designed so that upon rotation of the cam through a relatively small arc, the rod 45 will be raised from an initial lowered position, as shown in Fig. 13, an amount sufficient to lift the sticker arm so that the rack 14 will clear the gear 14a, as shown in Fig. 14.

Such rotation is imparted to the cam by means of a radial arm 49 secured to the shaft 41 and connected to a frame-mounted air cylinder unit 50, the functioning of which is controlled by the operator of the machine at his option. It will be observed that when the sticker arm is thus raised said arm moves about that one of the roller units 12 which is under the hopper as a fulcrum, and which unit supports the loaded portion of the sticker arm.

When the sticker arm is thus lifted, it is desirable that it shall be held from longitudinal movement, and which might prevent the necessary clean re-meshing of the rack and gear teeth when the cam is rotated in the retractive direction necessary to lower the sticker arm. To this end, bellcranks B, connected as a unit, are disposed on opposite sides of the block 46 and are journaled in common in connection with said block, as at P.

Figure 15:
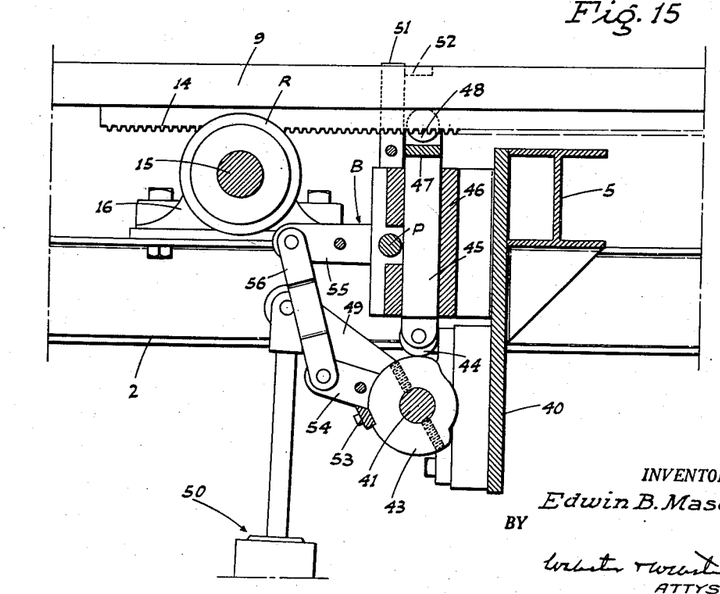
Fig. 15 is a side view showing the sticker arm as held against advancing movement after having been released, and taken substantially on line 15—15 of Fig. 12.

The upper arms 51 of the bellcranks straddle the sticker arm 9, and are disposed so that when swung back from a predetermined position they will contact stops 52 on the sides of the sticker arm, as shown at 15, and which stops are above the normal position of arms 51 so that the sticker arm may be advanced to a sticker feeding position without interference.

Such movement is imparted to the bellcranks by means of a cross bar 53 fixed on the cam and adapted to engage radial arms 54 turnably mounted on the shaft 41, and which arms are connected to the lower arms 55 of the bellcranks by links 56. The cross bar is disposed so that it engages the under side of arms 54 when the cam has been rotated sufficiently to cause the rack of the sticker arm to be disengaged from the gear, as shown in Fig. 14.

Further rotation of the cam in the same direction then causes the arms 54 to rotate with the cam, and the bellcranks to be swung so as to move the bellcrank arms 51 into contact with the stops 52. The cylinder unit 50 is arranged so that it cannot rotate the cam through an arc greater than necessary to bring arms 51 into contact with stops 52 without pushing the same back.

In certain installations, it has been found that the sticker-arm mechanism above described occupies an unduly great space laterally, and such as prevents the sticker hoppers from being as close together as is sometimes desirable.

Figure 16:
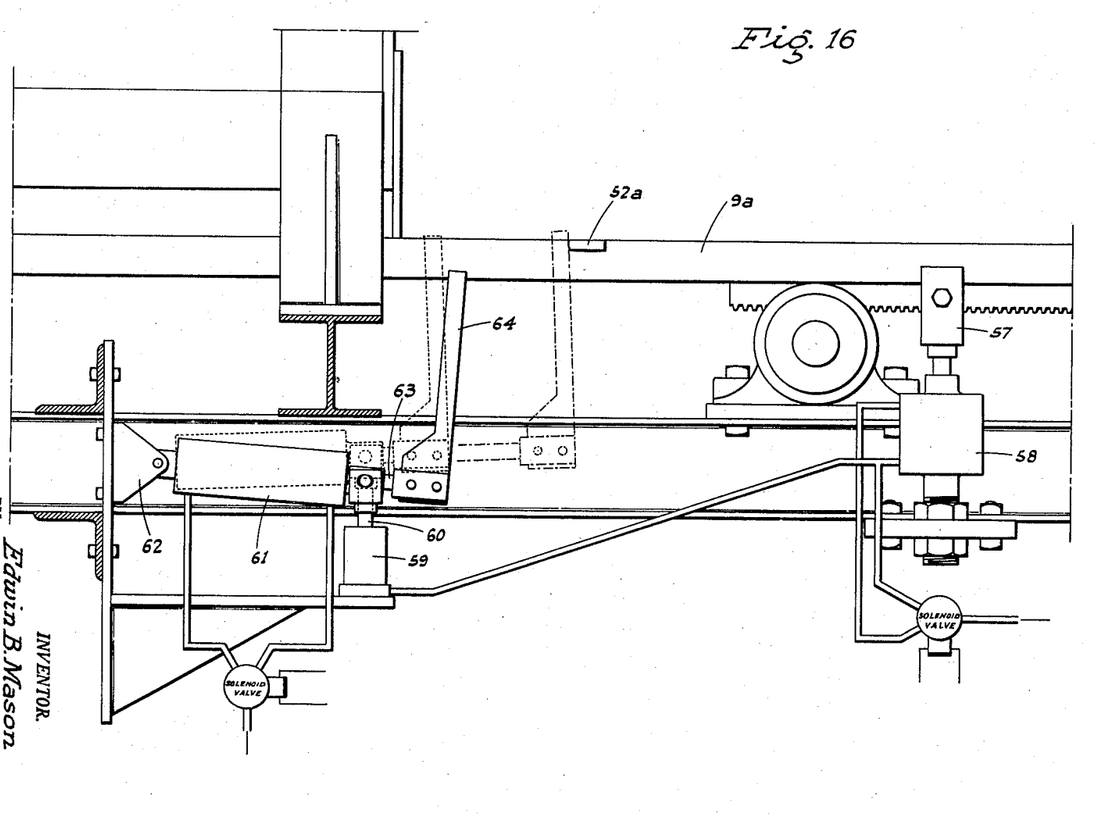
Fig. 16 is a fragmentary side view of one of the sticker hoppers and associated parts, showing a modified form of sticker arm release mechanism; the actuating elements of such mechanism being shown diagrammatically.

In such cases, the structure shown in Fig. 16 may be employed. This structure comprises a sticker-arm lifting saddle unit 57 directly connected to an air cylinder 58 so as to be lifted upon admission of air to the cylinder. At the same time, air is fed to another cylinder 59 ahead of cylinder 57, and the piston rod 60 which is operatively connected to the free end of a substantially horizontal air cylinder 61 whose other end is pivotally connected to a frame-mounted bracket 62. The piston rod 63 of cylinder 61 is rigid with an upstanding arm 64 disposed to one side of and adjacent the sticker arm 9a, and which is initially below and a certain distance ahead of a stop 52a on the side of said arm. Lifting of the cylinder 61 by cylinder 59 places the upper end of arm 64 in the path of stop 52a, so that upon advance of the piston rod 63, arm 64 moves into contact with stop 52a. The control elements of this structure are arranged so that once air has been admitted to cylinder 58, cylinders 59 and 61 function automatically and in properly timed relation to attain the desired result.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A machine to feed stickers onto a horizontal course of lumber comprising a plurality of upstanding sticker hoppers disposed to one side of and above such lumber course at right angles thereto and arranged in spaced relation lengthwise of the course, each hopper being arranged to retain a stack of horizontally disposed stickers, and mechanisms associated with the hoppers to feed stickers from the hoppers onto the lumber course, said mechanisms including sticker supporting arms each movable to convey a sticker from a hopper and deposit such sticker on the lumber course, operating means normally connected to all the arms to actuate the same in unison, and selectively operable means on the machine to disconnect any arm from the operating means.

2. A machine to feed stickers onto a horizontal course of lumber comprising a plurality of upstanding sticker hoppers disposed to one side of and above such lumber course at right angles thereto and arranged in spaced relation lengthwise of the course, each hopper being arranged to retain a stack of horizontally disposed stickers, sticker arms under the hoppers to receive the lowermost sticker of the hoppers therein and supported for longitudinal horizontal and limited vertical movement, mechanism to advance all the arms from an initial sticker receiving position to dispose such stickers over the lumber course and to then retract the arms, said mechanism including a rack extending along and under each arm, a driven shaft extending under all the arms, and gears on the shaft engaging the racks, and a selectively operable mechanism for each arm mounted on the machine and including an element engageable with the arm to lift the same sufficiently to disengage the rack thereof from the corresponding gear.

3. A machine, as in claim 2, with means included in part with said mechanism to then hold the lifted arm against longitudinal movement in the direction of the lumber course.

4. A machine to feed stickers onto a horizontal course of lumber comprising a plurality of upstanding sticker hoppers disposed to one side of and above such lumber course at right angles thereto and arranged in spaced relation lengthwise of the course, each hopper being arranged to retain a stack of horizontally disposed stickers, mechanisms associated with the hoppers to feed stickers from the latter and drop them onto the lumber course at a point short of a full overlap of the stickers over the lumber, and separate means to then advance the stickers as resting on the lumber the extent necessary to dispose the end edges of the stickers in alinement with the longitudinal outer edges of the lumber course.

5. A machine to feed stickers onto a horizontal course of lumber comprising a plurality of upstanding sticker hoppers disposed to one side and above such lumber course at right angles thereto and arranged in spaced relation lengthwise of the course, each hopper being arranged to retain a stack of horizontally disposed stickers, mechanisms associated with the hoppers to feed stickers from the latter and drop them onto the lumber course at a point short of a full overlap of the stickers over the lumber, means to shift the dropped stickers laterally so as to dispose the same in true right-angle relation with the lumber course, and means then acting to advance the stickers to a predetermined final position on the lumber course.

6. In a machine to feed stickers onto a horizontal course of lumber, a hopper disposed to one side of and above such lumber course at right angles thereto, said hopper being arranged to retain a stack of horizontally disposed stickers, a sticker arm elongated relative to the hopper disposed with a portion thereof initially directly under the hopper to receive and support the lowest sticker in the hopper and another portion disposed rearwardly of said hopper, bars in said other portion to push against the rear end of the supported sticker and to support the next sticker in the hopper upon advance of the sticker arm sufficient to withdraw the initially supported sticker from the hopper and dispose the same over the lumber course, members supporting the sticker arm for reciprocating movement, means on the hopper at its forward end to engage the advanced sticker and prevent retraction of the same with the sticker arm, and a stop on the hopper at its rear end to prevent retraction of said next sticker with the sticker arm as the latter is retracted.

7. In a machine to feed stickers onto a horizontal course of lumber, a hopper disposed to one side of and above such lumber course at right angles thereto, said hopper being arranged to retain a stack of horizontally disposed stickers, a sticker arm elongated relative to the hopper disposed with a portion thereof initially directly under the hopper to receive and support the lowest sticker in the hopper and another portion disposed rearwardly of said hopper, an element on the arm to push against and advance the supported sticker upon advance of the arm, members supporting the sticker arm for longitudinal reciprocating movement, one such member being under the hopper and arranged to serve as a fulcrum, a rack under said other portion of the sticker arm, a reversible gear engaging the rack, means engaging the sticker arm adjacent the gear and arranged to lift the arm about said fulcrum member and clear the rack from the gear, and actuating mechanism for such means.

8. In a machine to feed stickers onto a horizontal course of lumber, a hopper disposed to one side of and above such lumber course at right angles thereto, said hopper being arranged to retain a stack of horizontally disposed stickers, a sticker arm elongated relative to the hopper disposed with a portion thereof initially directly under the hopper to receive and support the lowest sticker in the hopper and another portion disposed rearwardly of said hopper, an element on the arm to push against and advance the supported sticker upon advance of the arm, members supporting the sticker arm for longitudinal reciprocating movement, one such member being under the hopper and arranged to serve as a fulcrum, a rack under said other portion of the sticker arm, a reversible gear engaging the rack, means engaging the sticker arm adjacent the gear and arranged to lift the arm about said fulcrum member and clear the rack from the gear whereby the arm is then disposed at an upward slope from said fulcrum member, actuating mechanism for such means, and means to then engage the lifted sticker arm and prevent the same from tending to move lengthwise in the direction of said fulcrum member.

9. A machine, as in claim 8, in which the last named means comprises a stop on and projecting laterally out from one side of the sticker arm, an arm pivoted on the machine between the stop and hopper in position to engage the stop upon swinging of the last named arm from an initial position clear of the stop, and means to so swing said arm upon the sticker arm being lifted.

10. In a machine to feed stickers onto a horizontal course of lumber, a hopper disposed to one side of and above such lumber course at right angles thereto, said hopper being arranged to retain a stack of horizontally disposed stickers, a sticker arm elongated relative to the hopper disposed with a portion thereof initially directly under the hopper to receive and support the lowest sticker in the hopper and another portion disposed rearwardly of said hopper, an element on the arm to push against and advance the supported sticker upon advance of the arm, members supporting the sticker arm for longitudinal reciprocating movement, one such member being under the hopper and arranged to serve as a fulcrum, a rack under said other portion of the sticker arm, a reversible gear engaging the rack, means engaging the sticker arm adjacent the gear and arranged to lift the arm about said fulcrum member and clear of the rack from the gear whereby the arm is then disposed at an upward slope from said fulcrum member, actuating mechanism for such means, means to engage the lifted sticker arm to prevent lengthwise movement of the same in the direction of the fulcrum member, and connection means between the mechanism and last named means to actuate the latter upon the sticker arm being lifted.

11. In a machine to feed stickers onto a horizontal course of lumber, a hopper disposed to one side of and above such lumber course at right angles thereto, said hopper being arranged to retain a stack of horizontally disposed stickers, a sticker arm elongated relative to the hopper disposed with a portion thereof initially directly under the hopper to receive and support the lowest sticker in the hopper and another portion disposed rearwardly of said hopper, an element on the arm to push against and advance the supported sticker upon advance of the arm, members supporting the sticker arm for longitudinal reciprocating movement, one such member being under the hopper and arranged to serve as a fulcrum, a rack under said other portion of the sticker arm, a reversible gear engaging the rack, a saddle unit engaging the sticker arm from below at a point adjacent the gear and in which the arm is slidable, a push-rod unit depending from the saddle and mounted for vertical movement, a rotary cam under the rod engaging the push rod unit to lift the same and normally retaining said unit in a lowered position, means to rotate the cam, a stop projecting laterally out from one side of the sticker arm and disposed adjacent the saddle when the sticker arm is fully retracted, an arm pivoted on the machine in position to engage the stop upon swinging of the last named arm from an initial stop-clearing position, and connection means between the cam and last named arm to so swing the latter immediately subsequent to the rotation of the cam to an extent sufficient to cause the sticker arm to be lifted so as to be free of the gear.

12. In a machine to feed stickers onto a horizontal course of lumber, a hopper disposed to one side of and above such lumber course at right angles thereto, said hopper being arranged to retain a stack of horizontally disposed stickers, a longitudinally movable sticker arm to feed the lowest sticker in the hopper from said hopper and drop the same onto the lumber course so that the rear end of the sticker is clear of but adjacent the hopper, a plate fixed with and below the discharge end of the hopper parallel to the same and adjacent but laterally offset therefrom so as to lap one side edge of the adjacent portion of the dropped sticker, a pusher pad mounted in connection with but opposite the plate to engage said adjacent portion of the sticker and shift the same flatly against the plate, and another pusher pad mounted in connection with the plate at right angles thereto and behind the dropped sticker to push against and further advance the same a predetermined distance onto the lumber course.

References Cited in the file of this patent

UNITED STATES PATENTS

| 1,129,214 | McIlvried | Feb. 23, 1915 |
| 1,705,570 | Horstkotte | Mar. 19, 1929 |
| 1,796,575 | Morgan | Mar. 17, 1931 |
| 2,402,048 | Hyde et al. | June 11, 1946 |
| 2,699,862 | Walter | Jan. 18, 1955 |